US012699662B2

(12) United States Patent
Pedersen et al.

(10) Patent No.: US 12,699,662 B2
(45) Date of Patent: Aug. 4, 2026

(54) DIRECT MEMORY ACCESS CONTROLLER CONFIGURED TO READ A JOB LIST FROM MEMORY AND PERFORM ONE OR MORE JOBS

(71) Applicant: Nordic Semiconductor ASA, Trondheim (NO)

(72) Inventors: Frode Pedersen, Trondheim (NO); James Nevala, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 13 days.

(21) Appl. No.: 18/612,725

(22) Filed: Mar. 21, 2024

(65) Prior Publication Data

US 2024/0320174 A1    Sep. 26, 2024

(30) Foreign Application Priority Data

Mar. 24, 2023    (GB) ..................................... 2304323

(51) Int. Cl.
*G06F 13/28*        (2006.01)

(52) U.S. Cl.
CPC .......... *G06F 13/28* (2013.01); *G06F 2213/28* (2013.01)

(58) Field of Classification Search
CPC ...................................................... G06F 13/28
USPC .......................................................... 710/22
See application file for complete search history.

(56) References Cited

U.S. PATENT DOCUMENTS 4,821,170 A    4/1989    Bernick et al.
5,708,849 A    1/1998    Coke et al.

5,752,081 A * 5/1998 Jirgal ...................... G06F 13/28
                                                    710/28
5,890,012 A * 3/1999 Poisner ................... G06F 13/28
                                                    709/212
5,928,339 A    7/1999 Nishikawa
(Continued)

FOREIGN PATENT DOCUMENTS

WO    WO 2011/040928 A1    4/2011
WO    WO 2019/229063 A1    12/2019
WO    WO 2020/002423 A1    1/2020

OTHER PUBLICATIONS

IPO Combined Search and Examination Report under Sections 17 and 18(3) for Great Britain Application No. 2304323.5, dated Oct. 4, 2023, 8 pages.

(Continued)

*Primary Examiner* — Titus Wong
(74) *Attorney, Agent, or Firm* — Klarquist Sparkman, LLP

(57) ABSTRACT

An electronic apparatus comprises a processor, memory, a direct memory access (DMA) controller, and a bus system. The processor and memory are coupled to the bus system. The DMA controller is coupled to the bus system at a bus connection point. The DMA controller comprises a plurality of inputs and circuitry configured, for each input of the inputs, in response to receiving a signal at the respective input, to: determine a respective memory address in dependence on which of the plurality of inputs received the signal; read from the memory a respective job list of one or more jobs located at the respective memory address, each job specifying a respective transfer operation for the DMA controller to perform; and perform each job in the job list by transferring data through the bus connection point in accordance with the respective transfer operation.

20 Claims, 3 Drawing Sheets

(56) References Cited

U.S. PATENT DOCUMENTS

| | | | |
|---|---|---|---|
| 6,154,793 A * | 11/2000 | MacKenna | G06F 13/28 |
| | | | 710/28 |
| 2009/0287858 A1 * | 11/2009 | Kawahara | G06F 13/28 |
| | | | 710/22 |
| 2009/0307399 A1 * | 12/2009 | Tsai | G06F 13/28 |
| | | | 710/106 |
| 2014/0181319 A1 * | 6/2014 | Chen | G06F 13/385 |
| | | | 709/234 |
| 2017/0214774 A1 * | 7/2017 | Chen | H04L 12/4633 |
| 2019/0044809 A1 * | 2/2019 | Willis | G06F 16/2255 |
| 2021/0216482 A1 * | 7/2021 | Winblad | G06F 13/28 |
| 2022/0070102 A1 * | 3/2022 | Wang | H04L 69/326 |
| 2022/0311544 A1 * | 9/2022 | Alverson | H04L 49/9047 |

OTHER PUBLICATIONS

"EXtensible Host Controller Interface for Universal Serial Bus (xHCI)," Intel, Requirements Specification, May 2019, Revision 1.2, Chapter 3, Architectural Overview, 51 pages.

* cited by examiner

DIRECT MEMORY ACCESS CONTROLLER CONFIGURED TO READ A JOB LIST FROM MEMORY AND PERFORM ONE OR MORE JOBS

CROSS REFERENCE TO RELATED APPLICATION

This application claims priority from Great Britain Application No. 2304323.5, filed Mar. 24, 2023, which application is incorporated herein by reference in its entirety.

TECHNICAL FIELD

This invention relates to an electronic apparatus comprising a direct memory access (DMA) controller.

BACKGROUND OF THE INVENTION

It is known for an electronic apparatus, such as a system-on-chip (SoC), to use a DMA controller to transfer data between memory locations within the apparatus as an alternative to using a processor of the apparatus to move the data. This can result in better performance or power savings by freeing the processor to perform other tasks or to be in a low-power sleep state while the data is being transferred. Software executing on the processor can configure the DMA controller for performing the transfer by providing suitable instructions for the DMA controller in advance of the transfer operation, and then initiating the transfer.

WO 2019/229063 A1 (Nordic Semiconductor ASA) describes an electronic apparatus having a DMA controller that is associated with a particular peripheral of the apparatus. The DMA controller can perform a sequence of two or more data transfers (e.g. writing data output by the peripheral to a memory location) in accordance with a job list that is stored in a memory of the apparatus. The DMA controller starts processing the job list in response to a register write action.

While such a DMA controller can provide significant performance improvements, the present inventors have realised that further improvements are possible in the design of electronic apparatus comprising a DMA controller.

SUMMARY OF THE INVENTION

From a first aspect, the invention provides an electronic apparatus comprising:
  a processor;
  memory;
  a direct memory access (DMA) controller; and
  a bus system,
wherein the processor is coupled to the bus system;
wherein the memory is coupled to the bus system;
wherein the DMA controller is coupled to the bus system at a bus connection point;
wherein the DMA controller comprises a plurality of inputs;
wherein the DMA controller comprises circuitry configured, for each input of the plurality of inputs, in response to receiving a signal at the respective input, to:
    determine a respective memory address in dependence on which of the plurality of inputs received the signal;
    read from the memory a respective job list of one or more jobs located at the respective memory address, wherein each of the one or more jobs specifies a respective transfer operation for the DMA controller to perform; and perform each of the one or more jobs in the job list by transferring data through the bus connection point in accordance with the respective transfer operation.

From a second aspect the invention provides a method performed by a DMA controller of an electronic apparatus, wherein the electronic apparatus comprises:
  a processor;
  memory;
  a direct memory access (DMA) controller; and
  a bus system,
wherein the processor is coupled to the bus system;
wherein the memory is coupled to the bus system;
wherein the DMA controller is coupled to the bus system at a bus connection point; and
wherein the DMA controller comprises a plurality of inputs, the method comprising, in response to a signal received at any of the plurality of inputs:
    determining a respective memory address in dependence on which of the plurality of inputs received the signal;
    reading from the memory a respective job list of one or more jobs located at the respective memory address, wherein each of the one or more jobs specifies a respective transfer operation for the DMA controller to perform; and
    performing each of the one or more jobs in the job list by transferring data through the bus connection point in accordance with the respective transfer operation.

Thus it will be seen that, in accordance with embodiments of the invention, a plurality of job lists may be stored at different memory locations, and, by sending a signal to an appropriate one of the inputs, the DMA controller may be triggered to process any selected one of the job lists. This ability to preconfigure several job lists and then to initiate any of them through a signal to the DMA controller provides much greater flexibility than a DMA controller that can be configured only to perform a single job list in response to start signal. For instance, it can allow multiple hosts (e.g. the processor and a second processor of the apparatus) to share the DMA controller by each configuring respective job lists at different memory address, such that any of the job lists can then be conveniently triggered simply by sending a signal to the appropriate input of the plurality of inputs.

The DMA controller circuitry may be configured to determine the respective memory address by reading a respective entry from a data structure stored in the memory. The data structure may be a table of pointers (i.e. memory addresses). It may be a job list pointer table. The data structure may hold a same number of pointers as there are inputs in the plurality of inputs. The DMA controller may comprise a hardware register for storing an address to the data structure. The register may be writable over the bus system, e.g. by the processor. This register may be accessible through the aforesaid bus connection point, or the DMA controller may be coupled to the bus system at a further bus connection point through which this register is accessible. For example, the aforesaid bus connection point may be on a main (e.g. AXI) bus, and the register may be accessed through a peripheral (e.g. APB) bus. The apparatus may comprise a plurality of processors or other hosts (i.e. bus masters on the bus system), and the DMA controller circuitry may be configured to read entries from a data structure that is stored in an area of the memory that is accessible to (e.g. readable and optionally writable by) each of the plurality of processors or hosts (i.e. from a shared memory area). The use of such a data structure can conveniently allow multiple hosts to determine, and optionally change, where to store respective job lists for processing by the DMA controller.

The job list may comprise a list (i.e. a sequence) of the one or more jobs stored in a contiguous region of memory. Each job may comprise at least one pointer field for storing an address in memory for the DMA controller to read data from or write data to. Each job may comprise a size field for storing an amount of data to read or write. Each job may comprise an attribute field and the DMA controller may be configured to use a value in the attribute field to determine a type of operation to perform (e.g. a write operation or a read operation).

The electronic apparatus may comprise one or more peripherals coupled to the bus system.

In some embodiments the DMA controller may be specific to one peripheral, e.g. being incorporated within the peripheral, for performing DMA read and/or write transfer operations for the peripheral over the bus system. The peripheral may be an interface (e.g. an SPI controller) or any other type of peripheral. The DMA controller may be configured to perform read operations and write operations, or only read operations, or only write operations. The DMA controller may be configured, for at least two of the plurality of inputs, to perform a same type of operation when performing a job from a respective job list read in response to receiving a signal at either of the inputs (i.e. at least two of the inputs can be used to perform read operations, or at least two of the inputs can be used to perform write operations).

In other embodiments the DMA controller may be provided within a DMA module that is configured to perform DMA transfer operations between configurable addresses— e.g. reading data from one memory address and writing the data to another memory address. The DMA controller may support both DMA read operations and DMA write operations. However, in some embodiments, the DMA controller is a first DMA controller and is configured to perform only DMA read operations (i.e. a "source" DMA controller), and the DMA module further comprises a second DMA controller (i.e. a "sink" DMA controller) that is configured to perform only DMA write operations. The DMA module may comprise a flow logic module for controlling a flow of data from the source DMA controller to the sink DMA controller, within the DMA module. The flow logic module may comprise a buffer for buffering the data. The buffer may be sized to be at least as large as a maximum burst length of the bus system. This can help to avoid deadlocks on the bus.

The second DMA controller may be connected at a second bus connection point, different from the bus connection point of the first DMA controller. However, in some embodiments the second DMA controller is coupled to the bus system through the same bus connection point as the first DMA controller (i.e. sharing the connection with the source DMA controller). This may advantageously reduce bus interconnect resources. It may also save space, which may be particularly desirable when, as in some embodiments, the electronic apparatus is an integrated circuit.

The second DMA controller may comprise a plurality of inputs and circuitry configured, for each input of the plurality of inputs, in response to receiving a signal at the respective input, to:

determine a respective memory address in dependence on which of the plurality of inputs received the signal;
read from the memory a respective job list of one or more jobs located at the respective memory address, wherein each of the one or more jobs specifies a respective transfer operation for the second DMA controller to perform; and
perform each of the one or more jobs in the job list by transferring data through the bus connection point, or through a second bus connection point, in accordance with the respective transfer operation.

This plurality of inputs may be distinct from the plurality of inputs of the first DMA controller. However, in some embodiments each input of the plurality of inputs of the first DMA controller is also an input of the plurality of inputs of the second DMA controller (i.e. the inputs are shared). Thus a same signal at an input of the plurality of inputs may cause both the first and second DMA controllers to read respective job lists from the memory, and to perform respective one or more jobs from the respective job lists.

The bus connection point may comprise at least a read data channel and a write data channel. It may consist of five channels: a write address channel, a write data channel, a write response channel, a read address channel, and a read data channel. The bus system may comprise an Advanced extensible Interface (AXI) bus, to which the DMA controller is coupled at the bus connection point. The bus system may comprise one or more further buses, such as an Advanced Peripheral Bus (APB), which may be communicatively coupled to the AXI bus. The DMA controller may be coupled to a further (e.g. APB) bus of the bus system at a further bus connection point, e.g. for providing access to a register interface of the DMA controller.

Each of the plurality of inputs may be coupled to a different respective signal line. The signal may be a pulse or a change in binary logic level.

The electronic apparatus may comprise a plurality of peripherals and a peripheral interconnect that is separate from the bus system. The peripheral interconnect may provide, or can be configured to provide, one or more channels for receiving event signals from one peripheral and for providing the event signals as input to another peripheral. A first peripheral may be configured to output event signals to the peripheral interconnect in response to changes of state within the first peripheral. A second peripheral may be configured to receive event signals from the peripheral interconnect and to initiate tasks on the second peripheral in response to the signals received from the peripheral interconnect. Such a peripheral interconnect can conveniently allow efficient peripheral-to-peripheral signalling that bypasses the bus system. The peripheral interconnect may be configurable (i.e. programmable).

In some embodiments, the plurality of inputs to the DMA controller may be a plurality of event signal lines from the peripheral interconnect. When the peripheral interconnect is appropriately configured, this can enable a job list to be conveniently performed in response to an event signal from a peripheral.

In some embodiments, the plurality of inputs may comprise a plurality of register inputs, writable over the bus system. These input registers may be accessible through the aforesaid bus connection point, or the DMA controller may be coupled to the bus system at a further bus connection point through which they are accessible. For example, the registers may be accessed through a peripheral (e.g. APB) bus. The registers may have different addresses or may be respective bits within a shared address (i.e. a single bit-field). The DMA controller may be configured to detect a write to any of the register inputs, and the signal received at an input may comprise a write. This can enable the processor or other host to initiate the processing of a selected job list by writing to the appropriate register input.

In some embodiments, the DMA controller comprises a plurality of event signal inputs and a corresponding plurality of register inputs, and is configured, for each event signal input and corresponding register input, in response to receiving a signal at either input, to determine a same respective memory address from which to read the respective job list. In this way, each job list can be initiated over the peripheral interconnect or by software over the bus system.

The DMA controller may further comprise a plurality of outputs. It may comprise a corresponding output for each input. The DMA controller may be configured to determine when all the one or jobs in the job list have been performed, and may be configured to output a completed signal in response to this determination. It may output the completed signal from an output that corresponds to the input at which the signal was received for performing the job list. The plurality of outputs may be a plurality of event signal lines to the peripheral interconnect. When the peripheral interconnect is appropriately configured, this can enable the DMA controller to notify a peripheral that a job list has been completed, in order to trigger some action by the peripheral. In some situations, the peripheral interconnect may be configured to pass a completed signal output by the DMA controller to an input of the same or a different DMA controller. In this way, two or more job lists may be performed in a sequential chain.

In some embodiments, the DMA controller comprises one or more interrupt request lines to the processor, and is configured to issue an interrupt request to the processor in response to determining that all the one or jobs in the job list have been performed. There may be a corresponding interrupt request line for each of the plurality of inputs, and the DMA controller may issue the interrupt request signal on an interrupt request line that corresponds to the input at which the signal was received for performing the job list. In other embodiments, there may be a single interrupt request line from the DMA controller to the processor. The DMA controller may comprise a set of one or more event output registers, readable by the processor, that the DMA controller uses to output an indication of which input received the signal for performing the latest-performed job list. The processor may read the one or more event output registers in response to receiving an interrupt signal. Thus, whether there are multiple interrupt request lines or only one, software executing on the processor may be conveniently notified when the processing of a job list has completed.

The DMA controller may be configured to queue signals received at different respective inputs. It may be configured to queue a signal received at an input while the DMA controller finishes performing all the jobs in an active job list, and to service the queued signal once the active job list is completed. The can enable modules (e.g. the processor or other hosts, or peripherals) to trigger a DMA job list whenever they are ready and still expect the job list to be executed at some point. The module may, in some embodiments, be notified once its requested job list has completed by a completed event signal or an interrupt request signal.

The DMA controller may be configured to service signals received at the plurality of inputs (e.g. queued signals) according to a priority system. Each of the plurality of inputs may have a different priority from an ordered set of priorities. The ordering may correspond to an indexing of a data structure that stores the respective memory addresses of the job lists (i.e. a job list pointer table). For instance, the first job list pointer in the table may have a lowest priority and the last job list pointer in the table may have a highest priority, or vice versa. In other embodiments, the DMA controller may be configured to service signals received at the plurality of inputs according to a round-robin scheduling.

The plurality of inputs may be any number but in some embodiments it is between two or three and eight inputs. The DMA controller may thus support up to this number of pre-configured job lists, without the processor or other host device having to perform any re-configuring.

The electronic apparatus may be an integrated circuit. It may be a system-on-chip (SoC). The electronic apparatus may support unique addressing of memory, including any memory-mapped peripheral registers, across the apparatus. The DMA controller may comprise hardware digital logic gates, which are distinct from logic gates of any processor of the electronic apparatus. The memory may comprise a plurality of different regions and/or memory types. The memory may comprise volatile memory (e.g. SRAM) and/or non-volatile memory (which may be rewritable or one-time programmable). It may comprise one or more hardware registers, e.g. of a peripheral. The pointers and memory addresses referred to herein may all be in a same type of memory or in different types of memory.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments of the invention will now be described, by way of example only, with reference to the accompanying drawings, in which.

DETAILED DESCRIPTION

Figure 1:
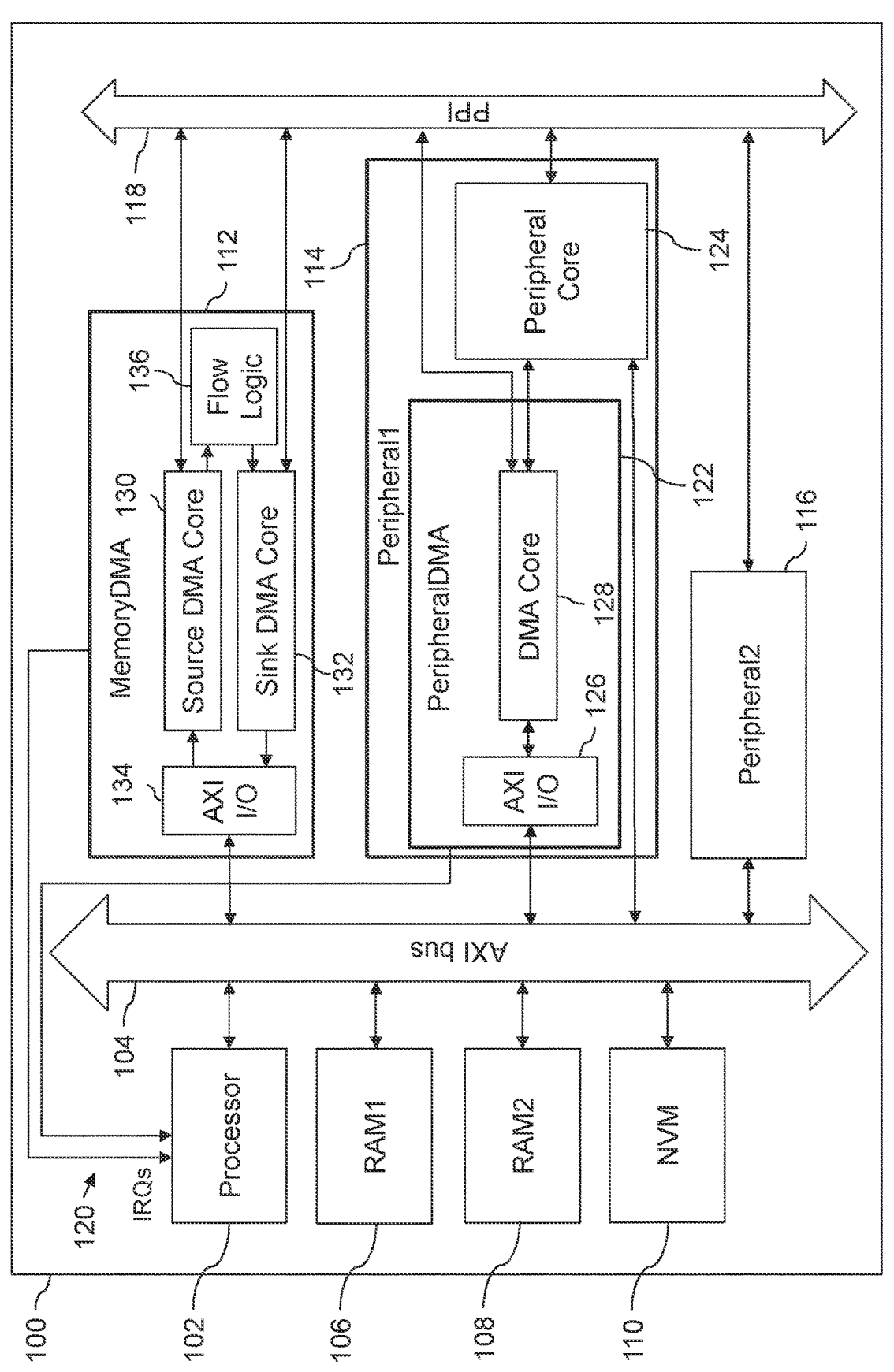
FIG. 1 is a schematic diagram of a system-on-chip (SoC) embodying the invention.

FIG. 1 shows a system-on-chip (SoC) 100. The chip 100 has a processor 102 that is communicatively coupled to an Advanced extensible Interface (AXI) bus 104. Also coupled to the AXI bus 104 are a first block of random-access memory (RAM1) 106, a second block of random-access memory (RAM2) 108, a non-volatile memory (NVM) 110 such as flash or ReRAM, a direct memory access (DMA) controller for performing memory-to-memory transfers (MemoryDMA) 112, a first peripheral 114, and a second peripheral 116. The MemoryDMA 112 and two peripherals 114, 116 are coupled to a programmable peripheral interface (PPI) 118 that is separate from the AXI bus 104. One or more interrupt request (IRQ) lines 120 are provided for sending interrupt signals to the processor 102 from at least the MemoryDMA 112 and the first peripheral 114.

Each of the peripherals 114, 116 may be an interface controller (e.g. a Serial Peripheral Interface or USB controller), a digital-to-analog converter (DAC), an analog-to-digital converter (ADC), a timer, a hardware cryptographic engine, a digital radio module, or any other type of peripheral. The chip 100 may include other components, such as further processors, additional peripherals, power and clock management circuitry, buses, interrupt lines, etc., which are not shown in FIG. 1 for simplicity. The SoC 100 implements chip-wide memory addressing. Peripherals may have memory-mapped interfaces, e.g. hardware registers for configuration settings, or for data input/output.

The PPI 118 provides a set of physical channels that are coupled to peripherals 114, 116 of the SoC 100, for direct signalling between peripherals (i.e. not via the processor 102) that occurs separately from the AXI bus 104. This allows a first peripheral to signal a second peripheral even if the processor 102 is in a low power (e.g. sleep) state, thereby allowing the SoC 100 to power down the processor 102 for reduced energy consumption yet still enable at least some of its peripherals to continue co-operating with each other. The PPI 118 includes a matrix of interconnects, switching logic and a controller. Software executing on the processor 102 can instruct the PPI 118 to establish communication channels between particular peripherals, and the peripherals can then use these channels to signal events and trigger tasks between themselves without further involvement of the processor 102. For instance, a PPI channel may be configured from a cryptographic engine to a general purpose input/output (GPIO) peripheral that enables the cryptographic engine to signal, over the channel, when it has finished encrypting some data, with this signal then triggering a task on the GPIO to access the encrypted data from a location in a shared memory and output the data from a GPIO port.

Of particular relevance to the present disclosure is the direct memory access (DMA) controller (PeripheralDMA) 122 that is contained within the first peripheral 114. This communicates with a peripheral core 124, for providing the peripheral 114 with direct access to one or more memories (e.g. the RAM1 106, RAM2 108 and NVM 110) of the SoC 100, without requiring data to pass through the processor 102. The peripheral core 124 implements the primary functionality of the peripheral 114, and its design will depend on the type of peripheral. By contrast, the design and operation of the PeripheralDMA 122 is not specific to the type of peripheral in which it is contained. In particular, one or more further peripherals may include further respective peripheral DMA controllers having an identical or very similar design to this PeripheralDMA 122.

The PeripheralDMA 122 contains AXI input/output (I/O) circuitry 126, for interfacing with the AXI bus 104, and a DMA core 128 comprising logic circuitry for performing direct memory access operations. The AXI I/O circuitry 126 is connected to the AXI bus 104 by a single AXI interface at a bus connection point, the AXI interface consisting of a write address channel, a write data channel, a write response channel, a read address channel, and a read data channel, through which the DMA core 128 sends and receives data.

The DMA core 128 can send data to and/or received data from the peripheral core 124. The DMA core 128 is also coupled to the PPI 118, and can signal interrupts to the processor 102 over one or more interrupt lines 120. It contains logic for implementing sequences of memory-access instructions, referred to herein as job lists. It can read a job list over the AXI bus 104 (e.g. from one or more memories 106, 108, 110) and implement the instructions contained therein. This allows software executing on the processor 102, or elsewhere, to control what DMA operations the core 128 performs. This process is described in more detail below. The PeripheralDMA 122 may be able to access some or all of the memories 106, 108, 110 and memory-mapped peripheral interfaces on the SoC 100, and may be configured (e.g. by software executing on the processor 102) for performing efficient data transfers between the peripheral 114 to and/or from memory addresses anywhere on the SoC 100 over the AXI bus 104, without the data having to travel via the processor 102.

The MemoryDMA 112 has a similar design to the PeripheralDMA 122 except that it contains two DMA cores—a source DMA core 130 and a sink DMA core 132—each of which is similar in design to the single DMA core 128 of the PeripheralDMA 122. The MemoryDMA 112 also has AXI I/O circuitry 134 for interfacing between the DMA cores 130, 132 and the AXI bus 104. Rather than being connected to a separate peripheral core, as the PeripheralDMA 122 is, the MemoryDMA 112 provides a path for data to pass, within the DMA controller 112, from the source DMA core 130 to the sink DMA core 132, via a flow logic module 136. This flow logic module 136 can control the flow and may also provide some buffering of data passing through it. The size of the buffer in the flow logic module 136 is determined by the maximum AXI burst length, which may be parameterizable. The buffer may be sized to at least accommodate a maximum length burst in order to avoid deadlocks on the AXI bus 104. Otherwise, in some embodiments, a deadlock might occur if the source DMA core 130 and sink DMA core 132 were to access the same single-port memory slave, with the sink DMA core 132 initiating a write burst before it has received enough data from the source DMA core 130 to finish the burst.

The provision of two independent DMA cores 130, 132 within the MemoryDMA 112 allows this DMA to read data from memory and to write data to memory simultaneously. It also allows the MemoryDMA 112 to perform a sequence of read operations in accordance with a first job list, while performing a sequence of write operations in accordance with a second job list. This can provide greater flexibility for configuring the operation of the DMA controller 112 than if it contained only a single DMA core for performing read and write operations. In some embodiments, the source DMA core 130 and sink DMA core 132 share a common job list selection and initiation mechanism, which can allow a source job list and a sink job list to be initiated together by a single PPI 118 signal or software action. The MemoryDMA 112 may be able to access some or all of the memories 106, 108, 110 and memory-mapped peripheral interfaces on the SoC 100, and may be configured (e.g. by software executing on the processor 102) for performing efficient data transfers between memory addresses anywhere on the SoC 100 over the AXI bus 104, without the data having to travel via the processor 102.

Figure 2:
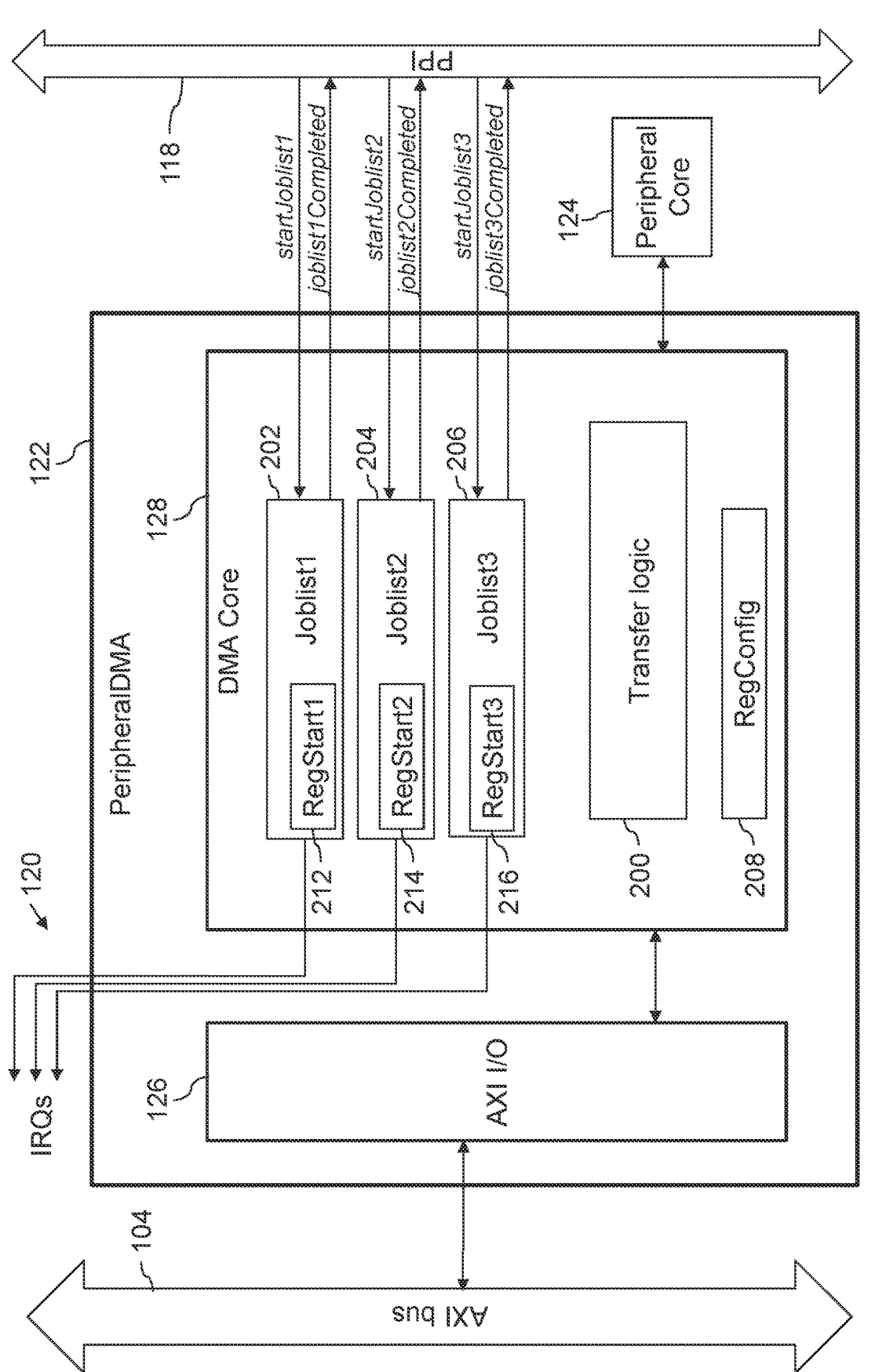
FIG. 2 is a schematic diagram showing part of the SoC of FIG. 1 in greater detail.

FIG. 2 shows the DMA core 128 of the PeripheralDMA 122 in more detail. Although this core 128 has been chosen by way of example, the source DMA core 130 and sink DMA core 132 may be configured and operate in the same way.

The DMA core 128 contains logic 200 for transferring data between the AXI I/O circuitry 126 and the peripheral core 124 (or, equivalent, between the AXI I/O 134 and the flow logic 136 in the case of the MemoryDMA 112). The behaviour of the transfer logic 200 is partly determined by what data is stored in a configuration register (RegConfig) 208, that can be written to over the AXI bus 104 (e.g. by the processor 102). Alongside this general transfer logic 200, the DMA core 128 also contains several job list signalling units 202, 204, 206 for interfacing with the PPI 118 and for signalling interrupts to the processor 102. In this example there are three such signalling units (Joblist1, Joblist2, Joblist3), for supporting the independent triggering of up to three different job lists, but there may be as few as two units or as many as eight or more units. Each of the job list signalling units 202, 204, 206 has a task triggering input line from the PPI 118, an event signalling output line to the PPI 118, and an interrupt request (IRQ) line leading to the processor 102.

To configure the peripheral DMA 122, a host such as the processor 102 writes one or more job lists in shared memory (e.g. in RAM1 106). The same host or a different host, also stores a pointer to each job list in a table of job list pointers also in shared memory. The job list and the job list pointer table can be located at any arbitrary memory locations (e.g. in RAM1 106 or RAM2 108). The same host or a different host also writes the address of the job list pointer table into the configuration register RegConfig 208 of the peripheral DMA 122. The writing of the job list pointer table, the writing to the configuration register 208, and the writing of each of the job lists, may be undertaken at different times, and in any order, and by the same or different hosts (e.g. by different processors or controllers on the SoC 100).

Figure 3:
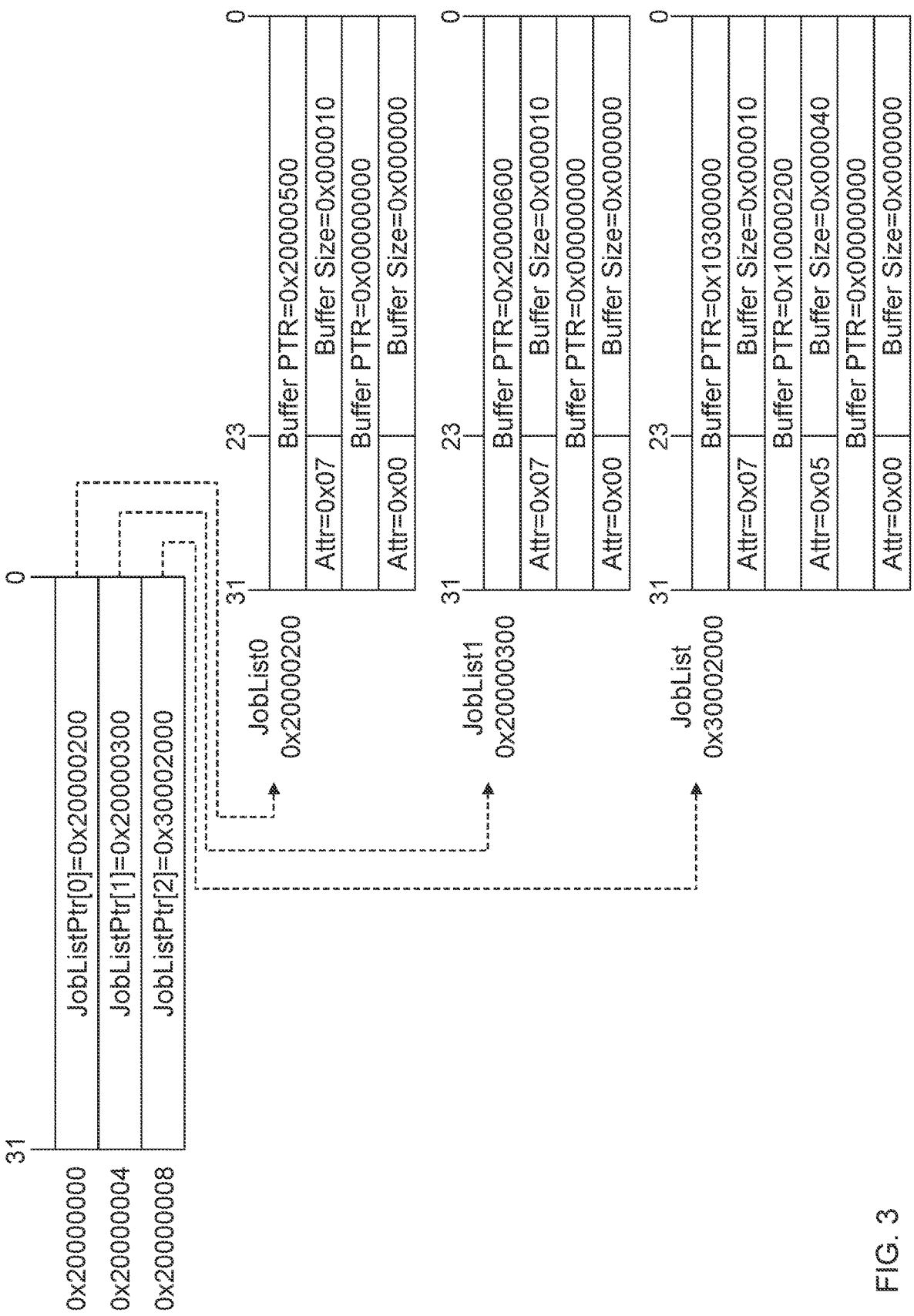
FIG. 3 is a diagram representing data that may be stored in a memory of the SoC of FIG. 1.

FIG. 3 shows an example of a job list pointer table and three exemplary job lists.

The job list pointer table consists of a data array storing an array of 32-bit pointers (referred to here as JobListPtr [0]-[2]) to respective memory locations where respective job lists may be stored. The same chip 100 may have various DMA cores, some of which may support different numbers of job lists. However, each job list pointer table should contain at most as many pointers as the number of distinct job list signalling units 202-206 within the DMA core 128 that the particular job list is intended to be processed by.

Each job list consists of a contiguous block of data having a predefined format. A job list holds a sequence of arbitrarily many jobs, with each job having three fields: a 32-bit pointer to region of memory (referred to here as a Buffer PTR), a 24-bit buffer size field, and an 8-bit attribute field. (In the case of the MemoryDMA 112, some embodiments may require that each source job list and each sink job list have the same amount of total data bytes.) Depending on the value it holds, the attribute field can instruct a straightforward DMA transfer of data to or from the Buffer PTR, or instruct a data transfer with a predefined transformation being applied to the data, or instruct some other type of operation, depending on the implementation. The attribute value is also passed to the peripheral core 124 which may use it for its own purposes. A Buffer PTR value of 0x00000000 is a special value that serves as an end marker for a job list.

It will be appreciated that the formats shown in FIG. 3 are just examples, and different embodiments may support differently formatted job list pointer tables or job lists.

The DMA core 128 is configured to execute a particular job list in response to a start signal received by the peripheral DMA controller 122. The start signal is specific to one of the three job list signalling units 202-206, which in turn corresponds to a respective one of the three job list pointer entries of the job list pointer table identified by the configuration register 208. For example, a signal to Joblist1 202 may cause the transfer logic 200 to access the first job list indexed in the job list pointer table, with the Joblist2 204 being associated with the job list indexed second in the table, and Joblist3 206 being associated the job list indexed third in the table.

Each job list signalling unit 202-206 can be started either by a respective task signal over the PPI 118 or by a write signal over the AXI bus 104. Each job list signalling unit 202-206 thus has a respective task input line from the PPI 118 (labelled startJoblist1, startJoblist2, startJoblist3 respectively in FIG. 2) for receiving a start signal from the PPI 118, and also has a start register (RegStart1 212, RegStart2 214, RegStart3 216, respectively) that can be written to over the AXI bus 104 in order to trigger execution of a corresponding job list. Each job list signalling unit 202-206 has circuitry for detecting a change to a value (e.g. a binary flag) stored in its respective start register 212-216. In some implementations, these start registers 212, 214, 216 (and potentially other interface registers of the PeripheralDMA 122) are not connected directly to the AXI bus 104, but are accessed instead through an Advanced Peripheral Bus (APB). In such embodiments, a write signal from the processor 102 would start on the AXI bus 104 but then be converted to be on the APB bus before reaching the register 212, 214, 216.

In this way, a preconfigured sequence of DMA transfer operations, specified by a job list stored in memory, can be initiated in response to a signal given by hardware over the PPI 118 (e.g. by another peripheral) or by software executing on a processor 102.

In response to a start signal, the job list signalling unit 202-206 instructs the transfer logic 200 to read the current job list pointer from the relevant entry in the job list table pointed to by RegConfig 208, and then to start reading and performing successive jobs from the job list pointed to by the job list pointer. The transfer logic 200 uses the AXI I/O circuitry 126 to perform each instructed read and/or write DMA job over the AXI bus 104.

Once the transfer logic 200 has read a special end marker (i.e. a job with a Buffer PTR value of 0x00000000), it notifies the relevant job list signalling unit 202-206 which issues a completed signal to the PPI 118 over an event output line specific to the signalling unit (labelled joblist1Completed, joblist1Completed, joblist1Completed respectively in FIG. 2). The signalling unit 202-206 can also send an interrupt request (IRQ) signal over an interrupt line 120 to the processor 102. There may be at least as many interrupt lines 120 as signalling units 202-206, with each signalling unit 202-206 being associated with a different interrupt line 120. Alternatively, each signalling unit 202-206 may issue interrupt request signals over the same, shared interrupt line 120, with a separate set of one or more output registers being used to communicate to the processor 102 which signalling unit 202-206 triggered the interrupt request. In some embodiments, each signalling unit 202-206 may always both signal over the PPI 118 and issue an interrupt. In other embodiments, it may do one or other, depending on how the start signal was received (e.g. issuing only a PPI signal if the job list was started over the PPI, and issuing only an interrupt if the job list was started by a register write). In further embodiments, the behaviour may be software configurable (e.g. it may depend on a setting value stored in a configuration register of the DMA core 128)—for instance, the signalling units 202-206 may always generate signals for the PPI 118, and may be configured to also issue an interrupt request or not, with a separate configuration setting for whether the job list was initiated over the PPI 118 or was software-triggered.

Each DMA core 128, 130, 132 only processes one job list at a time, but the ability to preconfigure several job lists (e.g. three in the example of FIG. 2) and then initiate a selected one of them with a single PPI or bus write, provides for a very flexible and responsive system. It also allows multiple hosts and/or other peripherals to configure and initiate DMA transfers by the same shared DMA core 128, 130 132. For instance, each of two or more hosts may be configured to have responsibility for a different respective job list entry in a shared job list pointer table.

The DMA core 128 may support queuing of job list starts whereby if a job list start signal is received while the transfer logic 200 is already active on another job list, the start request is queued and initiated as soon as the current job list completes. More than one pending job list may be stored in the queue. The host that initiated each job list can be notified when its job list has completed by receiving an interrupt or by subscribing to the relevant job completed event signal on the PPI 118. Some embodiments may support a priority system, e.g. with the lowest indexed job list in a job list pointer table having highest priority. When more than one job list is queued for processing once a current job list completes, the DMA core 128 may select the job list from the queue that a highest priority to process next, while in other embodiments the DMA core 128 may select successive job lists from the queue according to a round-robin scheduling.

The exact arrangement of the register interface and the PPI 118 input lines for starting job lists may, of course, vary between embodiments. For instance, the DMA core 128 may have a single start register, with a predetermined address, which stores a bit field with each bit corresponding to a different job list signalling unit 202-206. The start job list tasks may similarly be entirely independent tasks lines from the PPI 118, or may be combined as an indexable array of lines, with the indexing of the PPI input array being the same as the indexing of the job list pointer table.

Because the PPI 118 is programmable, it can, if desired, be configured so that a job list completed event signal output by a particular job list signalling unit 202-204 (e.g. job list3Completed) can be received as a start job list signal by a job list signalling unit of the same DMA core or a different DMA core, thus allowing chaining of DMA transfers to be performed. Such chaining may progress without involvement of the processor 102, which could remain in a sleep state. Thus seamless linking and/or synchronizing of data transfers for peripherals can be implemented by coordinating the behaviour of peripheral DMA controllers within two or more peripherals. For example, software on the processor 102 could link two SPI peripherals together (at least one of which has a DMA controller as described herein) through suitable PPI 118 configuration, such that a first SPI peripheral uses its DMA controller to move external data to internal memory, and then signals a job list completed PPI event, and this job list completed event is received by the second SPI peripheral which causes it to start an SPI task.

In the MemoryDMA 112, the source DMA core 130 and sink DMA core 132 may have the same number of job list signalling units (e.g. eight units in each core 130, 132), and these may be arranged such that the indexing of start job list task signal lines from the PPI 118 corresponds to the indexing into the respective job list pointer tables for the two cores 130, 132. In other words, the second task line to the source core 130 may correspond to the second entry in a source job list pointer table, and the second task line to the sink core 132 may also correspond to the second entry in a sink job list pointer table. In some embodiments, the job list signalling units in the source DMA core 130 and sink DMA core 132 are linked such that they share a common set of start registers and a common set of task input lines from the PPI 118. In this way, a single task start signal (e.g. to initiate the second job list) can conveniently initiate simultaneous processing of one source job list and one sink job list (e.g. the second job list from each respective pointer table).

Using the PPI system 118, the SoC 100 can be configured to determine which peripherals control which tasks of a DMA core 128. Different peripherals can then initiate their own DMA transactions without having to know what other peripherals are doing. The separate job lists pointed to in a job list pointer table may also be written to by different software threads, without them having to have synchronization between the threads.

The use of a job list pointer table that can be stored at a configurable location in general memory (e.g. RAM1 106 or NVM 110) provides a lot of flexibility, especially where multiple hosts are sharing one DMA controller. However, in some alternative embodiments, the locations of the job list pointers may be fixed, e.g. with each job list pointer being written to a respective configuration register of the DMA core 128 that has a respective predefined address.

It will be appreciated by those skilled in the art that the invention has been illustrated by describing one or more specific embodiments thereof, but is not limited to these embodiments; many variations and modifications are possible, within the spirit and scope of the disclosure.

We claim:

1. An electronic apparatus comprising:
   a processor;
   memory;
   a direct memory access (DMA) controller; and
   a bus system,
   wherein the processor is coupled to the bus system;
   wherein the memory is coupled to the bus system;
   wherein the DMA controller is coupled to the bus system at a bus connection point;
   wherein the DMA controller comprises a plurality of inputs;
   wherein the memory is configured to store:
      a data structure comprising a plurality of entries, corresponding to the plurality of inputs, wherein each entry stores a respective memory address of a plurality of memory addresses; and
      a plurality of job lists, corresponding to the plurality of inputs, wherein each job list is stored at a corresponding memory address of the plurality of memory addresses, and wherein each job list comprises one or more jobs; and
   wherein the DMA controller comprises circuitry configured, for each input of the plurality of inputs, in response to receiving a signal at the respective input, to:
      identify the respective entry corresponding to the input that receives the signal;
      read the corresponding memory address from the respective entry of the data structure;
      read from the memory the respective job list of one or more jobs located at the respective memory address, wherein each of the one or more jobs specifies a respective transfer operation for the DMA controller to perform; and
      perform each of the one or more jobs in the job list by transferring data through the bus connection point in accordance with the respective transfer operation.

2. The electronic apparatus of claim 1, wherein the data structure is a table of pointers to job lists, the table holding a same number of pointers as there are inputs in the plurality of inputs.

3. The electronic apparatus of claim 1, wherein the DMA controller comprises a hardware register for storing an address to the data structure, the hardware register being writable by the processor over the bus system.

4. The electronic apparatus of claim 1, wherein the electronic apparatus comprises a plurality of processors or other hosts, coupled to the bus system, and the circuitry of the DMA controller is configured to determine the respective memory address by reading entries from a data structure that is stored in an area of the memory that is accessible to each of the plurality of processors or hosts.

5. The electronic apparatus of claim 1, wherein the job list comprises a list of the one more jobs stored in a contiguous region of memory.

6. The electronic apparatus of claim 1, wherein each of the one or more jobs comprises:

a respective pointer field for storing an address in memory for the DMA controller to read data from or write data to;

a size field for storing an amount of data to read or write; and an attribute field, wherein the DMA controller is configured to use a value in the attribute field to determine a type of operation to perform when performing the respective job.

7. The electronic apparatus of claim 1, wherein the DMA controller is a first DMA controller within a DMA module that is configured to perform DMA read and write operations between configurable memory addresses, the first DMA controller being configured to perform only DMA read operations, wherein the DMA module further comprises a second DMA controller that is configured to perform only DMA write operations, and wherein the DMA module further comprises a flow logic module for controlling a flow of data, within the DMA module, from the first DMA controller to the second DMA controller.

8. The electronic apparatus of claim 7, wherein the flow logic module comprises a buffer for buffering the data flowing from the first DMA controller to the second DMA controller, wherein the buffer is sized to be at least as large as a maximum burst length of the bus system.

9. The electronic apparatus of claim 7, wherein the second DMA controller comprises a plurality of inputs and circuitry configured, for each input of the plurality of inputs, in response to receiving a signal at the respective input, to:

determine a respective memory address in dependence on which of the plurality of inputs received the signal;

read from the memory a respective job list of one or more jobs located at the respective memory address, wherein each of the one or more jobs specifies a respective transfer operation for the second DMA controller to perform; and perform each of the one or more jobs in the job list by transferring data through the bus connection point, or through a second bus connection point, in accordance with the respective transfer operation.

10. The electronic apparatus of claim 9, wherein each input of the plurality of inputs of the first DMA controller is also an input of the plurality of inputs of the second DMA controller.

11. The electronic apparatus of claim 1, wherein the bus system comprises an Advanced extensible Interface (AXI) bus, and wherein the bus connection point is a point on the AXI bus and consists of a write address channel, a write data channel, a write response channel, a read address channel, and a read data channel.

12. The electronic apparatus of claim 1, wherein the electronic apparatus comprises a plurality of peripherals that are interconnected by a configurable peripheral interconnect that is separate from the bus system, wherein the peripheral interconnect can be configured to provide one or more channels for receiving event signals from one peripheral of the plurality of peripherals and for providing the event signals as input to another peripheral of the plurality of peripherals, and wherein the plurality of inputs to the DMA controller comprise a plurality of event signal lines from the peripheral interconnect to the DMA controller.

13. The electronic apparatus of claim 1, wherein the plurality of inputs comprises a plurality of register inputs, writable over the bus system, and wherein the DMA controller is configured to detect a write to any of the plurality of register inputs as a signal received at the respective input.

14. The electronic apparatus of claim 1, wherein the DMA controller comprises a plurality of event signal inputs and a corresponding plurality of register inputs, and is configured, for each event signal input and corresponding register input, in response to receiving a signal at the event signal input or at the register input, to determine a same respective memory address from which to read the respective job list.

15. The electronic apparatus of claim 1, wherein the DMA controller comprises a plurality of outputs comprising a corresponding output for each of the plurality of inputs, and is configured to determine that all of the one or jobs in the job list have been performed, and, in response to determining that all of the one or jobs in the job list have been performed, to output a completed signal from an output that corresponds to the input at which the signal was received for performing the job list.

16. The electronic apparatus of claim 1, wherein the DMA controller comprises one or more interrupt request lines to the processor, and is configured to issue an interrupt request to the processor in response to determining that all the one or jobs in the job list have been performed.

17. The electronic apparatus of claim 1, wherein the DMA controller is configured to queue signals received at different respective inputs of the plurality of inputs, and is configured to queue a signal received at an input of the plurality of inputs while the DMA controller completes all of the one or more jobs of an active job list, and to service the queued signal once the active job list is completed.

18. The electronic apparatus of claim 17, wherein each of the plurality of inputs has a different priority from an ordered set of priorities, and wherein the DMA controller is configured to service queued signals according to a priority of the respective input at which each queued signal was received.

19. The electronic apparatus of claim 1, wherein the electronic apparatus is an integrated circuit.

20. A method performed by a DMA controller of an electronic apparatus, wherein the electronic apparatus comprises:

a processor;

memory;

a direct memory access (DMA) controller; and a bus system, wherein the processor is coupled to the bus system;

wherein the memory is coupled to the bus system;

wherein the DMA controller is coupled to the bus system at a bus connection point;

wherein the DMA controller comprises a plurality of inputs;

wherein the memory stores:

a data structure comprising a plurality of entries, corresponding to the plurality of inputs, wherein each entry stores a respective memory address of a plurality of memory addresses; and a plurality of job lists, corresponding to the plurality of inputs, wherein each job list is stored at a corresponding memory address of the plurality of memory addresses, and wherein each job list comprises one or more jobs;

the method comprising, in response to a signal received at any of the plurality of inputs:

identifying the respective entry of the plurality of entries corresponding to the input that receives the signal;

reading the corresponding memory address from the respective entry of the data structure;

reading from the memory the respective job list of one or more jobs located at the respective memory address, wherein each of the one or more jobs specifies a respective transfer operation for the DMA controller to perform; and performing each of the one or more jobs in the job list by transferring data through the bus connection point in accordance with the respective transfer operation.

\* \* \* \* \*